United States Patent [19]
Bakshi et al.

[11] Patent Number: 6,101,328
[45] Date of Patent: Aug. 8, 2000

[54] SYSTEM FOR PREVENTING MULTIPLE INSTANCES OF THE SAME DYNAMIC EXECUTABLE MODULE

[75] Inventors: Bikram Singh Bakshi; Michael Man-Hak Tso, both of Hillsboro, Oreg.

[73] Assignee: Intel Corporation, Santa Clara, Calif.

[21] Appl. No.: 09/001,293

[22] Filed: Dec. 31, 1997

Related U.S. Application Data

[60] Provisional application No. 60/046,593, May 15, 1997.

[51] Int. Cl.[7] .................................................. G06F 9/445
[52] U.S. Cl. ........................................................ 395/712
[58] Field of Search ............................................. 395/712

[56] References Cited

U.S. PATENT DOCUMENTS

| | | | |
|---|---|---|---|
| 5,373,375 | 12/1994 | Weldy ..................................... | 358/523 |
| 5,410,651 | 4/1995 | Sekizawa et al. ................... | 395/200.54 |
| 5,517,612 | 5/1996 | Dwin et al. ............................... | 395/166 |
| 5,544,320 | 8/1996 | Konrad .............................. | 395/200.09 |
| 5,673,322 | 9/1997 | Pepe et al. ................................ | 380/49 |
| 5,684,969 | 11/1997 | Ishida ...................................... | 395/342 |
| 5,701,451 | 12/1997 | Rogers et al. ........................... | 395/600 |
| 5,706,434 | 1/1998 | Kremen et al. .................... | 395/200.09 |
| 5,724,556 | 3/1998 | Souder et al. ........................... | 395/500 |
| 5,727,159 | 3/1998 | Kikinis ............................... | 395/200.76 |
| 5,742,768 | 4/1998 | Gennaro et al. .................... | 295/200.33 |
| 5,742,905 | 4/1998 | Pepe et al. ............................... | 455/461 |
| 5,768,510 | 6/1998 | Gish .................................... | 395/200.33 |
| 5,805,735 | 9/1998 | Chen et al. .............................. | 382/239 |
| 5,835,914 | 11/1998 | Brim ....................................... | 707/206 |

OTHER PUBLICATIONS

Daniel et al. A Metadata Architecture for Digital Libraries. IEEE. pp. 276–288, Apr. 1998.

Scales et al. Towards Transparent and Efficient Software Distributed Shared Memory. ACM. pp. 157–169, Oct. 1997.

Shin et al. Analytic Models of Adaptive Load Sharing Schemes in Distributed Real-Time Systems. IEEE. pp. 740–761, Jul. 1993.

Ram et al. Enterprise Computing: The Java Factor. IEEE. pp. 115–117, Jun. 1997.

*Primary Examiner*—Tariq R. Hafiz
*Assistant Examiner*—Wei Zhen
*Attorney, Agent, or Firm*—Kenyon & Kenyon

[57] ABSTRACT

A system for preventing multiple instances of a dynamic executable module from being loaded on a device is implemented by a method including the steps of maintaining state information for the device; and providing a dynamic executable module to the device if the state information indicates that no other instance of the dynamic executable module is already loaded on the device.

15 Claims, 3 Drawing Sheets

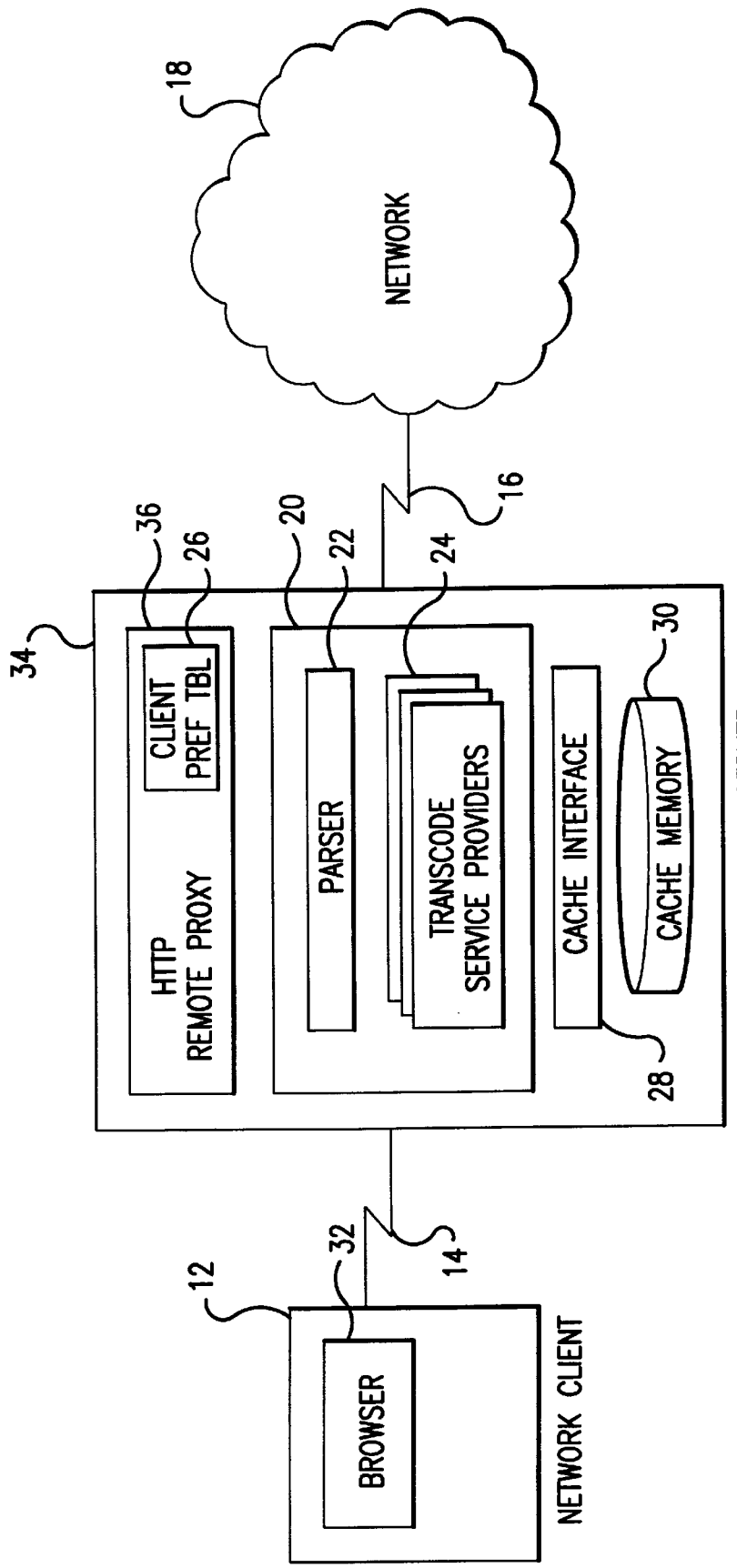

ns may cause processing errors at the
SYSTEM FOR PREVENTING MULTIPLE INSTANCES OF THE SAME DYNAMIC EXECUTABLE MODULE This application claims the benefit of the identically-titled U.S. Provisional Application Ser. No. 60/046,593, filed May 15, 1997 by Bikram S. Bakshi et al. and assigned to Intel Corporation, the disclosure of which is expressly incorporated herein by reference.

BACKGROUND OF THE INVENTION

1. Field of the Invention

The present invention relates generally to the field of data communications for personal computers (PCs), and in particular to a system for ensuring that only a single instance of a dynamic executable module (DEM) resides on a network device.

2. Related Art

With the increasing popularity of the Internet, and particularly the World-Wide Web ("the Web"), a variety of data processing tools have been developed to assist users, Internet Service Providers (ISPs) and content providers in exploiting the vast capabilities of this relatively-new network environment. Among these tools are utilities for developing so-called dynamic executable modules, examples of which are Java, JavaScript, VBScript and JScript. Dynamic executable modules are essentially self-contained programs which may be embedded in a data object transmitted to a network device, such as a client computer, for automatic execution upon receipt.

One particularly advantageous use for such dynamic executable modules is in connection with systems for dynamically transcoding network content. In such systems, as described further below, a network proxy, a transcoding server or some similar device may be configured to serve as an intermediary between a plurality of client devices and an external network such as the Internet. The intermediary device intercepts all messages transmitted between the client devices and the external network, and may be configured to transcode network content prior to transmitting it to a client device. In this context, the term "transcode" refers to virtually any manipulation of data, including deletion, addition, modification, compression and scaling. In such a system, dynamic executable modules may be used to obtain user preference information affecting the manner in which a variety of available transcoding services operate. For example, through interactions with a dynamic executable module the user of a client machine may specify that content downloaded from the Internet should be compressed in a manner which reduces user-visible latency. This is, of course, only one example of the seemingly endless uses for dynamic executable modules.

A problem which may arise with respect to the use of dynamic executable modules is that under certain circumstances it may be possible for multiple instances of the same dynamic executable module to be downloaded to and/or execute on a single client device. For example, according to certain implementations of dynamic transcoding systems, a dynamic executable module may be embedded in each Web page downloaded to a client device through a network proxy or a transcoding server. In such a case, a number of different conditions may result in multiple instances of the same dynamic executable module inadvertently being loaded onto the client machine, including (1) browsing a Web page that includes HTML-FRAMES (a facility of the HyperText Markup Language); (2) browsing a Web page which is configured to itself launch another instance of the client machine's browser to browse a different URL (Uniform Resource Locator); and (3) executing multiple instances of a browser (or a number of different browsers) on the client machine, each of which generate requests for data objects that are serviced by the same remote proxy. In all of these circumstances, the remote proxy may embed the same dynamic executable module into every page that is requested, resulting in multiple instances of the dynamic executable module being loaded onto the client machine. At best, downloading multiple instances of the same dynamic executable module is inefficient and/or wasteful; at worst, such multiple instances may cause processing errors at the client and/or the remote proxy.

In view of the increasing use of dynamic executable modules and the risks of multiple instances described above, there is a need for a system capable of ensuring that only a single instance of any given dynamic executable module is downloaded to and/or executed by a network device.

SUMMARY OF THE INVENTION

An embodiment of the present invention is implemented as a method for preventing multiple instances of a dynamic executable module from being loaded on a device. According to this embodiment, state information is maintained for the device. A dynamic executable module is then provided to the device if the state information indicates that no other instance of the dynamic executable module is already loaded on the device.

BRIEF DESCRIPTION OF THE DRAWINGS

FIG. 3 is a schematic diagram illustrating a system of a type to which embodiments of the present invention may be applied.

DETAILED DESCRIPTION

Embodiments of the present invention provide a system for ensuring that only a single instance of a dynamic executable module is downloaded to a client machine by another network device (for example, a proxy or server). In general, rather than automatically embedding a dynamic executable module into each data object requested by the client machine, such as a Web page or other HTML object, the other network device first ensures there is no instance of the dynamic executable module already running on the client device. In addition, each dynamic executable module that is downloaded may be programmed to essentially create its own operating environment on the client device that is independent of the browser that is used to access the Web, thereby preventing additional instances of an existing dynamic executable module from being spawned as a result of activities on the client device. These and other features are described in detail below.

Figure 1:
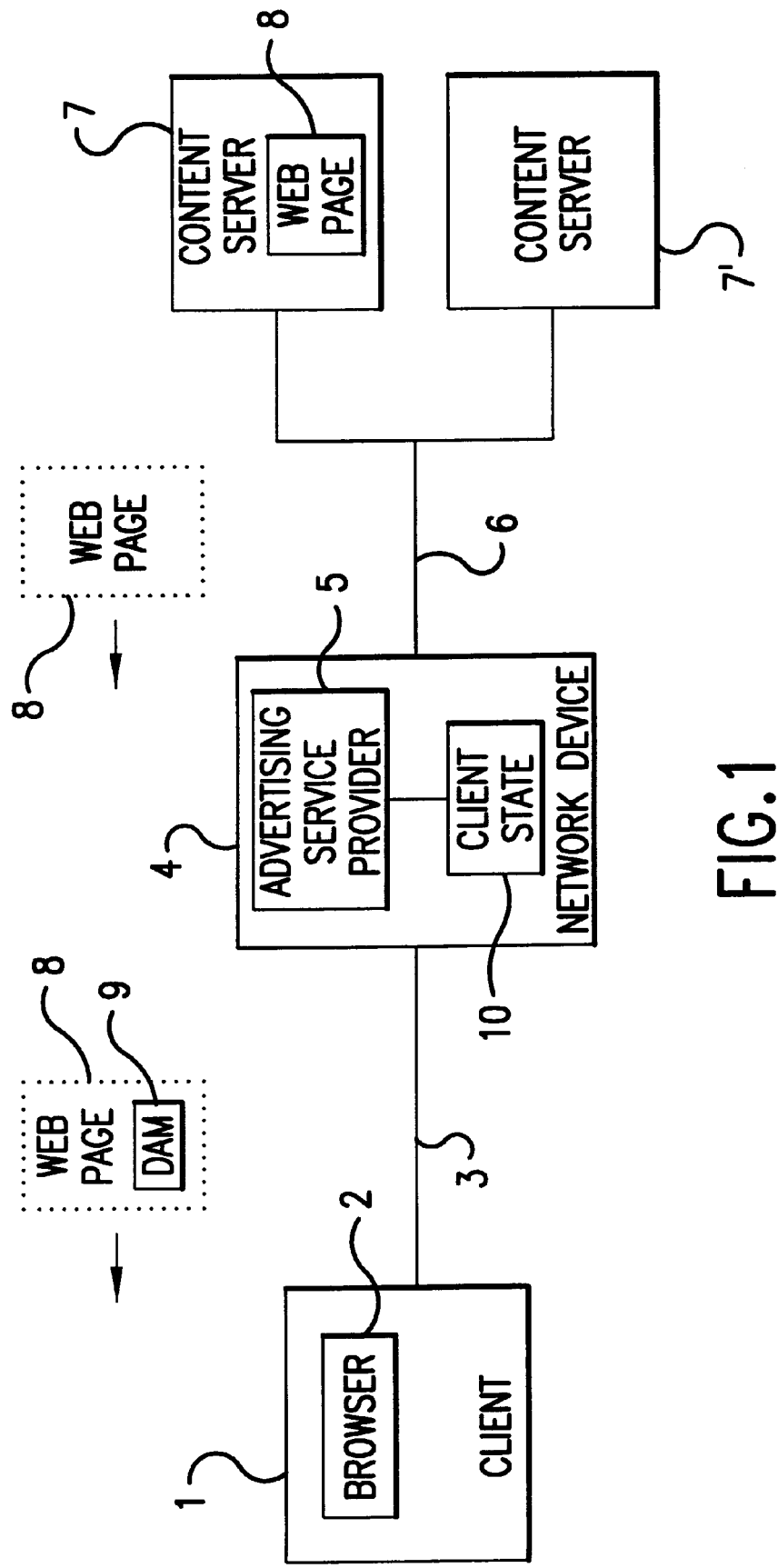
FIG. 1 is a schematic diagram illustrating an embodiment of the present invention.

Looking now at a first embodiment of the present invention, illustrated in FIG. 1, a client device 1 may access a plurality of content servers 7 through a network device 4. Client device 1 includes a browser 2, such as Netscape™, which enables a user of client device 1 to retrieve and display network data objects, such as Web pages resident on content server 7. Content server 7 may reside, for example, on the Internet and be accessible through standard HTTP (HyperText Transfer Protocol) calls; however, the present invention is not limited to any particular network or communications method. In this particular embodiment, network device 4 is a network proxy through which a plurality of client devices 1 access network resources such as content servers 7. Alternatively, network device 4 may itself comprise a network server, a content server, or some other type of stand-alone computer or distributed system of computers coupled, for example, to an ISP's (Internet Service Provider's) network, a corporate network, or anywhere on the Internet. Although FIG. 1 illustrates only a single client device 1, network device 4 will typically be configured to provide multiple client devices with access to network resources.

In the particular system shown in FIG. 1, network device 4 includes an advertising service provider 5 responsible for managing the provision of dynamic content to client device 1. Advertising service provider 5 distributes advertising content to client device 1 by embedding a dynamic advertising module (DAM) 9 into one or more Web pages 8 downloaded to client device 1. Advertising service provider 5 may comprise a software module installed in, or otherwise executable by, network device 4. Dynamic advertising module 9 may comprise a dynamic executable module of a type known in the art implemented, for example, using a utility such as Java, JavaScript, VBScript or JScript, which automatically executes upon being loaded onto client device 1.

As discussed further below with reference to FIG. 3, network device 4, and particularly advertising service provider 5, may be configured to maintain state information relating to each client device 1 with which it interacts. Such state information may be maintained, for example, in a client state table 10 or similar data structure keyed by a unique identifier for client device 1, such as a network IP (Internet Protocol) address. In order to support embodiments of the present invention, client state table 10 includes an indicator for whether a particular client device 1 currently has a dynamic executable module 9 loaded thereon. Such an indicator may be maintained, for example, by programming dynamic executable module 9 to periodically transmit a so-called "heartbeat" or "keepalive" message to network device 4. Advertising service provider 5 may then periodically check whether dynamic executable module 9 has transmitted the keepalive message within some predetermined time period (preferably longer than the period between transmissions by dynamic executable module 9, if loaded) and update the corresponding entry in client state table 10 accordingly. Advertising service provider 5 may then interrogate client state table 10 prior to downloading a data object to client device 1, and only embed dynamic executable module 9 if the information in client state table 10 indicates that no other instance is already loaded.

The foregoing embodiments may be implemented, for example, as part of a system for dynamically transcoding network content. With reference to FIG. 3, network client 12 communicates with an external network 18 through a transcoding server 34. Network client 12 includes a browser 32, such as the Netscape Navigator v.3.0 browser (although the invention is not limited in this respect), which manages the presentation of data to a user. In the illustrated arrangement, network client 12 is "non-enabled," meaning no specialized transcoding software is preloaded on network client 12. Network 18 may comprise, for example, the Internet. In this particular arrangement, network client 12 communicates requests for information to, and receives information from, transcoding server 34 over a client/server communications link 14. Transcoding server 34 in turn communicates with computers resident on network 18 through server/network communications link 16. The respective communications links 14, 16 may comprise any suitable communications media known in the art.

Transcoding server 34 may be configured to provide a wide variety of transcoding services to network client 12 and/or network devices, such as content servers, with which network client 12 communicates. In this context, as noted above, the term "transcode" refers to virtually any type of addition, deletion or modification of data transmitted to or from network client 12 by or through transcoding server 34. In addition to the provision of dynamic content such as advertising, examples of such transcoding services include data compression, image scaling, and dynamic removal of predetermined content. In the context of the present invention, the provision of a dynamic executable module (for any of a variety of purposes) may be the only transcoding service provided to a particular client device, or may be only one of a variety of services.

As illustrated in FIG. 3, transcoding server 34 may include a transcoder 20 with a parser 22 and a plurality of transcode service providers 24. Parser 22 is configured to act upon data received by transcoder 20, such as a request for a network object generated by client device 12 or a reply to such a request provided by a content server or other device on network 18. In this particular example, parser 22 is responsible for selectively invoking one or more of transcode service providers 24 based upon a predetermined selection criterion. With reference to FIG. 1, advertising service provider 5 may be implemented, for example, as a transcoding service provider 24.

In the arrangement shown in FIG. 3, transcoding server 34 includes an HTTP (HyperText Transfer Protocol) remote proxy 36, capable of accessing network 18 over server/network communications link 16. HTTP remote proxy 36 provides functionality different from known network proxies, which generally are little more than a conduit for requests to, and replies from, external Internet resources, in that it is capable not only of examining such requests and replies, but also of acting upon commands in the requests by, for example, determining whether or not to transcode content. Moreover, using transcoder 20, HTTP remote proxy 36 is capable of changing content received from network 18 prior to returning it to a requesting network client 12.

Looking more closely at the arrangement shown in FIG. 3, transcoder 20 is coupled to HTTP remote proxy 36. Parser 22 manages the transcoding of data to be transmitted from transcoding server 34 to network client 12. To this end, parser 22 controls transcode service providers 24 to selectively transcode content based on a predetermined selection criterion. For example, one or more transcode service providers 24 may provide the capability to compress and/or scale different types of data content, such as image, video, or HTML (HyperText Markup Language), in addition to providing content blocking functionality as discussed above. Transcoding server 34 may also include a server-side cache memory 30 managed by a server-side cache interface 28. Server-side cache memory 30 may be used to store both original and transcoded versions of content for later transmission to network client 12 without the need to re-retrieve the content from network 18 or to re-transcode the content.

Parser 22 may comprise a relatively simple, uniform interface to HTTP remote proxy 36, and may provide an API (Application Programming Interface) for transcoding data received by HTTP remote proxy 36. Parser 22 manages one or more transcode service providers 24 that are accessed through a common SPI (Service Provider Interface). In this particular implementation, parser 22 is designed in compliance with the Windows Open Systems Architecture (WOSA), and may be implemented as a Win32 DLL (Dynamic Link Library). The WOSA architecture, described in *Readings on Microsoft Windows and WOSA* (Microsoft Corp. 1995), enables additional transcode service providers 24 to be dynamically added to the system to provide new features and/or better transcoding algorithms, while at the same time not requiring changing or retesting other software components in the system.

Like parser 22, server-side cache interface 28 may be modeled after a standard Get/Set interface. Server-side cache memory 30 essentially "owns" all cached objects, in that it manages the properties and storage of the objects and may invalidate any non-locked object at any time; however, the actual format of any given cached object is known only by parser 22 and its associated transcode service providers 24. Thus, for data integrity and transcoding efficiency purposes, all access to server-side cache memory 30 in this arrangement is through parser 22.

In operation, transcoder 20 may use a Read( ) call to read data from a specified cached object data stream. For example, transcode service provider 24 may invoke this call and tunnel stream data through HTTP remote proxy 36 directly to network client 12. Similarly, a Write( ) call may be used to cache data from a new HTTP data stream. This call will append an incoming data stream received from, for example, a Web server or transcode service provider 24, to an opened cache stream which may be concurrently read using the Read( ) call.

Parser 22 may be configured to include the following calls:

```
GetObject(URL, InParams, &OutParams, &OutStream, ...);
GetScaledObject(URL, InParams, &OutParams, &OutStream, Stage, ...);
PutObject(URL, InParamStruct, &InStream, &OutParams,
&OutStream, ...).
```

Parser 22 may use such calls to manage the provision of requested content to network client 12. For example, the GetObject( ) call may be used to service non-enabled client requests, and returns a non-transcoded (original) version of a specified hypertext object. In this arrangement, transcoding server 34 assumes that each HTTP request has a unique thread that may be blocked until the request is satisfied. Accordingly, the GetObject( ) call will block until it either returns the requested data stream or indicates failure with a cause (e.g., object does not exist). This ability to return a so-called standard hypertext object is advantageous for compatibility reasons, enabling embodiments of the present invention to be used with existing browsers that do not include support for certain transcoding functionality (e.g., advanced data compression), and enabling users to selectively retrieve non-transcoded versions.

The GetScaledObject( ) call is similar to GetObject( ), and is also used to request an object from server-side cache memory 30; however, it adds support for requesting a particular version of that object, such as a high-quality rendition. Unlike traditional caching proxies, transcode service providers 24 can use server-side cache memory 30 to store several different versions of an object to support clients with different communications and/or presentation capabilities. Thus, an additional "Stage" parameter may be used to indicate which version of the cached object is to be returned to network client 12. Where transcode service provider 24 is configured to scale network content, it may use this parameter to request a version of a cached object having, for example, a default scaled quality, a refinement to a better-quality version, or the original non-scaled version.

In this particular arrangement, when network client 12 requests a hypertext object, HTTP remote proxy 36 uses either the GetObject( ) or GetScaledObject( ) call (depending on if network client 12 is capable of receiving scaled/transcoded datatypes) to retrieve the hypertext object from parser 22. If the hypertext object is not found, parser 22 uses the CreateEntry( ) call to create an entry (in effect, a placeholder) in server-side cache memory 30 for the new object. The new entry is returned to HTTP remote proxy 36, which requests the hypertext object from network 18. As a data stream for the hypertext object is returned, HTTP remote proxy 36 calls parser 22 using the PutObject( ) call, passing into this call the new entry and the handle to the data stream to be placed into the entry. Parser 22 selects an appropriate transcode service provider 24 based, for example, on the content type of the data stream. In this context, the term content type encompasses a datatype, an HTTP MIME (Multipurpose Internet Mail Extensions) type, a content format, and so on. The selected transcode service provider 24 uses a separate thread to read the incoming data stream, transcode it (for example, scan for predetermined content and delete it if found), and place it within the entry of server-side cache memory 30. The current thread immediately returns to HTTP remote proxy 36, which once again calls GetScaledObject( ) (or GetObject( )). This case will always result in a cache hit. This thread then works simultaneously with the separate thread in the PutObject( ) to tunnel data (either original or transcoded) from transcoding server 34 to network client 12.

Figure 2:
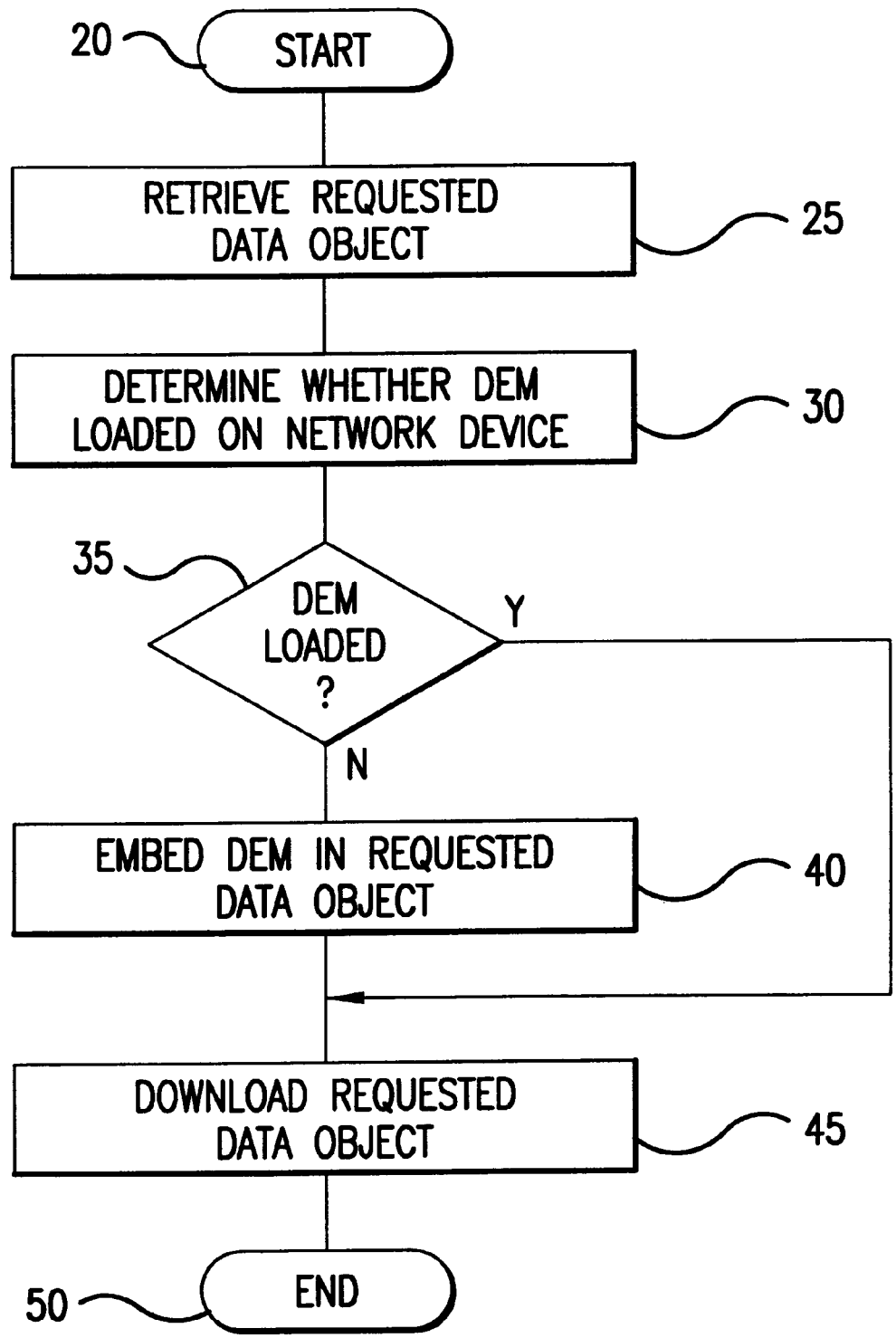
FIG. 2 is a flow diagram illustrating a method for preventing multiple instances of a dynamic executable module according to an embodiment of the present invention.

By way of further illustration, FIG. 2 provides a flow diagram of a method for preventing multiple instances of a dynamic executable module from being downloaded to a network device according to an embodiment of the present invention. For ease of description, reference is made to structural features of the system illustrated in FIG. 1; however, the method is not limited to that or any other particular structural environment. Upon retrieval of a data object to be downloaded to client device 1 (Step 25), network device 4 determines whether an instance of dynamic executable module 9 is already loaded on client device 1 (Step 30). If not, network device 4 embeds dynamic executable module 9 into the data object (Step 40). Network device 4 then downloads the data object to client device 1 (Step 45).

Referring back to the embodiment illustrated in FIG. 1, in spite of taking precautions such as the "heartbeat" approach described above, it is still possible that network device 4 may incorrectly determine that no dynamic executable module 9 is loaded on client device (or that a previously-loaded dynamic executable module 9 has terminated). For example, unexpectedly large network latencies may delay receipt of a keepalive message by network device 4, possibly causing the information in client state table 10 regarding the state of client device 1 to be out-of-date. As a result, network device 4 may download dynamic executable module 9 even though another instance already exists on client device 1. According to another embodiment of the present invention, negative effects of such an error may be minimized by programming dynamic executable module 9 to explicitly identify its operating environment, such as by assigning a name tag to the new instance of browser 2 launched by dynamic executable module 9. Thus, even if a second instance of dynamic executable module 9 is downloaded to client device 1, that second instance would generally not be initiated because the operating system running on client device 1 would detect that an application having the same name is already loaded. This is only one of several known techniques for preventing a second instance of dynamic executable module 9 from running in the event it is inadvertently downloaded to client device 1.

Embodiments of the present invention may be distributed, for example, as a set of instructions residing on a storage medium. Such a storage medium might be a memory of a computer; a piece of firmware; a portable storage device, such as a diskette or other magnetic storage device, or a CD-ROM; or any other medium on which it is known to store executable instructions.

Although embodiments of the present invention have been described largely with reference to applications for servicing requests for Internet data, persons skilled in the art will recognize that it is equally applicable to other networking environments. For example, embodiments of the present invention may be used in connection with the distribution of dynamic content to users on an "intranet" (typically a secure corporate network modeled after the Internet architecture). Similarly, the scope of the present invention is not limited to networking environments, since the disclosed embodiments are applicable to any environment in which one device is configured to provide a dynamic executable module to another device.

The foregoing is a detailed description of particular embodiments of the present invention. The invention embraces all alternatives, modifications and variations that fall within the letter and spirit of the claims, as well as all equivalents of the claimed subject matter. Persons skilled in the art will recognize from the foregoing detailed description that many other alternatives, modifications and variations are possible.

What is claimed is:

1. A method for preventing multiple instances of a dynamic executable module from being loaded on a device, said method comprising:

maintaining state information for the device;

updating said state information upon receipt of a periodic signal from a dynamic executable module loaded on the device; and providing an instance of the dynamic executable module to the device if the state information indicates that no other instance of the dynamic executable module is already loaded on the device.

2. The method of claim 1, wherein said providing an instance of the dynamic executable module further comprises determining that no other instance of the dynamic executable module is loaded on the device if the periodic signal is not received within a predetermined time period.

3. The method of claim 2, wherein the predetermined time period has a duration greater than a frequency at which the periodic signal is transmitted by the dynamic executable module on the device.

4. The method of claim 1, further comprising the step of establishing an operating environment on the device for the dynamic executable module.

5. The method of claim 4, further comprising the step of assigning a single name for use by all instances of the dynamic executable module.

6. A device for preventing multiple instances of a dynamic executable module from existing on a second device coupled thereto by a communications link, said device comprising a computer including instructions for:

maintaining state information for the second device;

updating said state information upon receipt of a periodic signal from a dynamic executable module loaded on the second device; and downloading an instance of the dynamic executable module to the second device if the state information indicates that no other instance of the dynamic executable module is already loaded on the second device.

7. The device of claim 6, wherein said instructions for downloading an instance of the dynamic executable module include instructions for determining that no other instance of the dynamic executable module is loaded on the second device if the periodic signal is not received within a predetermined time period.

8. The device of claim 7, wherein the predetermined time period has a duration greater than a frequency at which the periodic signal is transmitted by the dynamic executable module on the second device.

9. The device of claim 6, further including instructions for establishing an operating environment on the second device for the dynamic executable module.

10. The device of claim 9, further including instructions for assigning a single name for use by all instances of the dynamic executable module.

11. A storage medium containing a set of instructions for execution by a computer coupled to a device by a communications link, wherein the set of instructions comprises instructions for:

maintaining state information for the device;

updating said state information upon receipt of a periodic signal from a dynamic executable module loaded on the device; and downloading an instance of the dynamic executable module to the device if the state information indicates that no other instance of the dynamic executable module is already loaded on the device.

12. The storage medium of claim 11, wherein said instructions for downloading an instance of the dynamic executable module comprise instructions for determining that no other instance of the dynamic executable module is loaded on the device if the periodic signal is not received within a predetermined time period.

13. The storage medium of claim 12, wherein the predetermined time period has a duration greater than a frequency at which the periodic signal is transmitted by the dynamic executable module on the device.

14. The storage medium of claim 11, further comprising instructions for establishing an operating environment on the device for the dynamic executable module.

15. The storage medium of claim 14, further comprising instructions for assigning a single name for use by all instances of the dynamic executable module.

* * * * *